United States Patent [19]

Terraillon

[11] 4,280,574
[45] Jul. 28, 1981

[54] BALANCE WITH SELECTABLE MULTIPLE READING SCALES

[76] Inventor: Paul Terraillon, Le Mont Gosse, Monnetier-Mornex, France

[21] Appl. No.: 88,525

[22] Filed: Oct. 26, 1979

[30] Foreign Application Priority Data

Nov. 9, 1978 [CH] Switzerland .................. 11535/78

[51] Int. Cl.³ .................. G01G 23/22; G01G 3/08
[52] U.S. Cl. .................. 177/41; 177/229
[58] Field of Search .................. 177/41, 229

[56] References Cited

U.S. PATENT DOCUMENTS

| | | | |
|---|---|---|---|
| 823,397 | 6/1906 | Craft | 177/41 |
| 1,610,197 | 12/1926 | Brumser | 177/41 |
| 1,676,052 | 7/1928 | Rogers | 177/41 X |
| 4,119,162 | 10/1978 | Ackeret | 177/229 |
| 4,223,750 | 9/1980 | Perego | 177/41 |

*Primary Examiner*—George H. Miller, Jr.
*Attorney, Agent, or Firm*—Pennie & Edmonds

[57] ABSTRACT

Disclosed is a weighing balance having a material-receiving pan (3) and an indicator (4) that moves in a slot (5) of housing (1) to indicate the weight of the material along the graduated scale (6). On the opposite side of the slot (5) from the graduated scale (6) is provided a seat (7) defined by a wall (1a), end wall (9), base (2) and transparent wall (8) within which a notebook (11) is seated. The notebook (11) has a set of pages each carrying different graduation scales (13) along one edge thereof with a ring binding (12) arranged along the opposite edge thereof whereby the notebook (11) may be removed from the seat (7) and the pages moved about the ring binding (12) to bring a selected page to the front for visibility through the wall (8) when the notebook is again inserted in the seat (7).

6 Claims, 6 Drawing Figures

BALANCE WITH SELECTABLE MULTIPLE READING SCALES

BACKGROUND

1. Field of the Invention

The field of this invention is weighing balances having a material-receiving pan, an indicator movable along a predetermined path a distance responsive to the amount of weight of the material in said pan, and a graduated scale arranged along a side of said predetermined path. More specifically, this invention relates to such a balance in which it is desired or necessary to arrange different graduated scales along the predetermined path, which, in cooperation with the moving indicator, can be used to indicate weight in different scales, such as Anglo-Saxon units or metric units, or, if desired, to indicate on other scales different characteristics, such as calories, lipids, glucids, or the like. Utilization of different scales for different purposes may also include scales for facilitating the making of mixtures and recipes using special scales.

2. Prior Art

Heretofore when special scales have been required, it has been known to use overlying stickers or separate cards positionable adjacent to the predetermined path of the indicator. When stickers are used, it is not possible to frequently change back and forth and, generally, they are useful only when a single change is to be made. When cards are used, they are positioned on the balance individually adjacent to the path of movement of the indicator. This arrangement, however, leads to mislaying the cards and to having the cards shuffled so that they are no longer in a logical order making it impossible to retrieve them rapidly.

BRIEF SUMMARY OF THE INVENTION

The object of the present invention is to supply a balance with selectable multiple reading scales of any desired number which eliminates the above mentioned disadvantages of stickers and individual cards. In accordance with the present invention, the balance has on its face a seat positioned adjacent the predetermined path travelled by the indicator. The seat includes a front wall of the balance frame or body and spaced therefrom a transparent wall. A notebook dimensioned to fit neatly between the wall of the body and the transparent wall is provided, which notebook includes a number of pages each having a different set of indicia thereon and any one of which may be positioned at the top of the set of pages in order to exhibit its indicia through the transparent wall. The edge of the pages carrying the indicia is thus positioned adjacent to the predetermined path of the indicator so that the indicator may indicate the quantity in the desired units. The pages are preferably bound with a ring binder in order to permit easy positioning of any selected page at the front.

DETAILED DESCRIPTION OF THE FIRST EMBODIMENT

Figure 1:
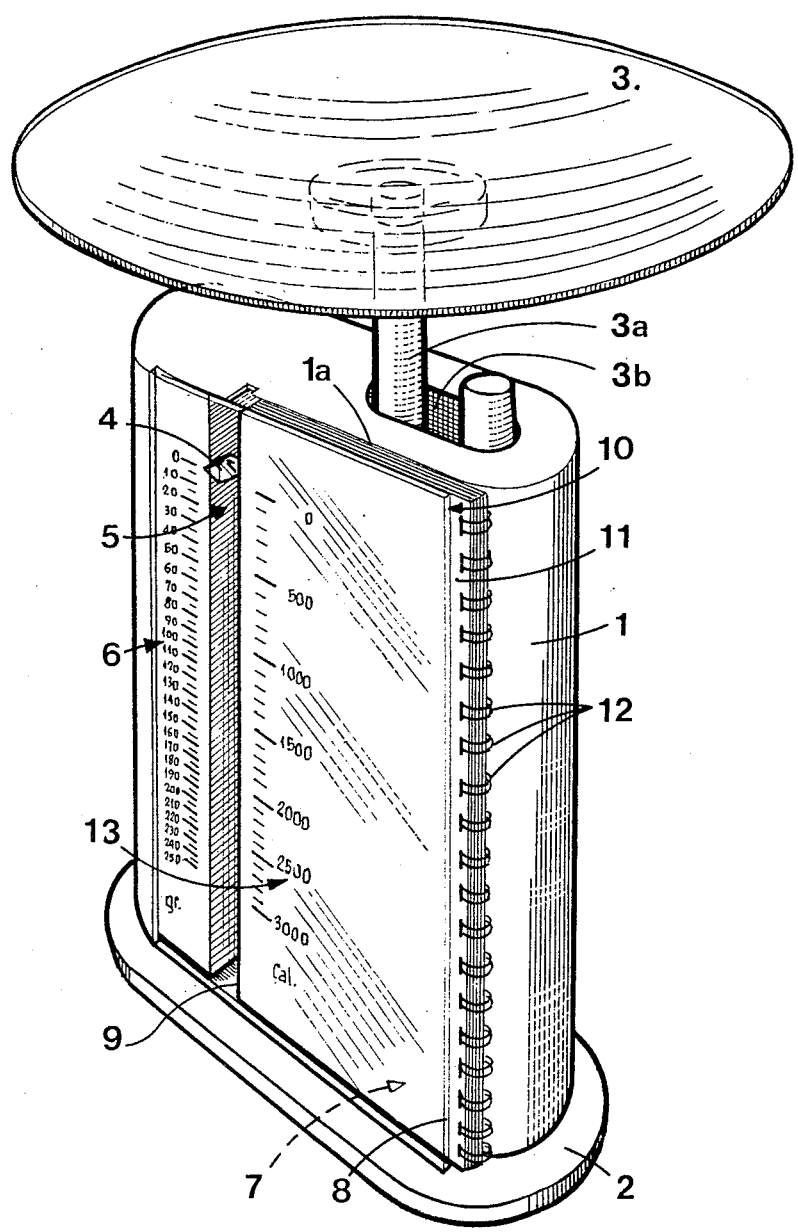
FIG. 1 is a perspective view of a balance incorporating the invention.

The balance shown in FIG. 1 comprises a housing 1 secured to a base 2. A material-receiving pan 3 for receiving material to be weighed is mounted on the upper end of a rod 3a. The rod 3a extends downwardly through an opening 3b in the top of the vertical housing 1. The rod 3a is secured in known manner to a weighing mechanism within the housing 1, which weighing mechanism is conventional and is, therefore, not shown. The weighing mechanism does include an indicator element 4 which extends through a vertical rectilinear slot 5 in the housing 1. The indicator 4 moves along the slot 5 a distance determined by the amount of weight placed upon the pan 3. A set of indicia or graduations 6 are provided on the housing 1 and extend along one of the edges of the slot 5. As shown in FIG. 1, the indicia 6 indicate grams.

As shown in FIG. 1, the housing 1 has a generally oblong cross-section taken in a horizontal plane and includes a front wall 1a extending vertically and which wall 1a includes an outwardly extending end wall 9 which defines one side (the right side as viewed in the figure) of the slot 5. Spaced from and parallel to the wall 1a is a transparent wall 8 which joins the end wall 9 along one vertical edge of wall 8 and the base 2 along the bottom edge of wall 8. The wall 1a together with the end wall 9, base 2 and the transparent wall 8 define a seat 7 open along edge 10 and also along the top edge of seat 7.

Inserted in the seat 7 and removable and reinsertable therein is a notebook 11 comprising a set of pages each of which carries a scale along one edge thereof by means of applied indicia. Opposite to the edge carrying the scale 13, the pages of the notebook 11 are bound together by means of a known ring binding 12 around which the pages may be rotated in order to select any particular one thereof and bring it into the front or top position of the set. As shown in FIG. 1, the scale 13 on this particular top sheet is visible through the transparent wall 8 and is graduated in calories.

Figure 2:
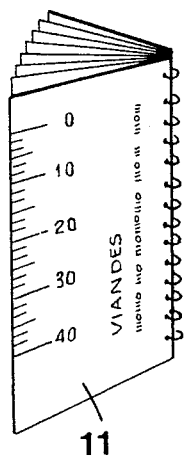
FIG. 2 is a perspective view of the notebook from FIG. 1 removed from the balance and having one of the selectable pages shown at the front.

It will be noted that when the notebook is properly seated as shown, the ring binding 12 remains outside of the seat 7 and the opposite edge of the notebook abuts against the end wall 9 of the seat 7, thus positioning the scale 13 of the top sheet adjacent to the slot 5 along which the indicator 4 travels. It will also be noted that any particular food item placed upon the scale will have both its weight in grams and its calories indicated simultaneously by the indicator 4. For each type of food, a different page is available having a calorie scale for that type of food. FIG. 2 shows the notebook removed from the balance and having a page marked "VIANDES". This page shows calories when meat is weighed. Instead of calories, the particular page selected may show for a particular food some other component of that food which is predictable by the weight thereof. For example, there may be a page for showing carbohydrates, lipids, gluids, and the like, with a separate page for each such characteristic it is desired to weigh or measure with a different page also for different foods.

Figure 3:
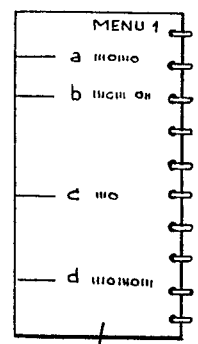
FIG. 3 is a front elevation of the notebook removed from the balance showing a page different from that of FIG. 2 with different indicia thereon.

The notebook may also show sheets for the rapid preparation of dishes in accordance with a prescribed recipe, such an arrangement is shown in FIG. 3 and which page is marked "MENU 1". By use of such a sheet, it is possible to mix the ingredients by weight as they are weighed, if the menu or recipe is properly constructed. For example, a bowl may be placed upon pan 3 and the indicator set to zero. A quantity of a first ingredient of the recipe may be added to bring the indicator to the line marked "a", as shown in FIG. 3. Then, a quantity of a different ingredient may be added to the bowl to move the indicator from "a" to "b". Then, a third ingredient is added to move the indicator from "b" to "c", and so on. The distance between zero and the "a" mark corresponds to the weight of the first ingredient to be used while the distance between mark "a" and mark "b" corresponds to the weight of the second ingredient to be used and the distance between mark "b" and mark "c" corresponds to the weight of the third ingredient to be used, and so on.

MODIFIED EMBODIMENTS

Figure 4:
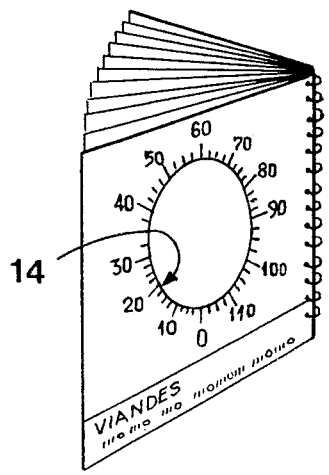
FIG. 4 is a perspective view of the notebook for use with a balance having an indicator that moves in a circular path.
Figure 5:
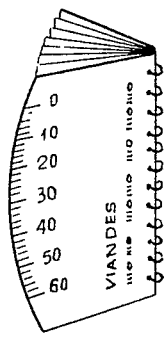
FIG. 5 is a perspective view of a notebook for use with a balance having an indicator that moves along an arcuate path and in which the notebook is to be inserted on the concave side of the arcuate path.
Figure 6:
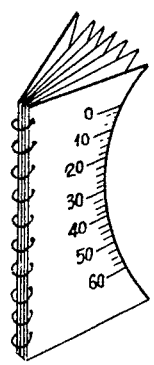
FIG. 6 is a perspective view of a notebook for use with a balance having an indicator that moves in an arcuate path in which the notebook is to be positioned on the convex side of the arcuate path.

The various modifications shown in FIGS. 4, 5 and 6 are for balances having indicators that move in other than a straight line. In FIG. 4, the notebook has a round hole 14 through all of the pages thereof. The diameter of the hole 14 is slightly greater than the circle in which the indicator element of the balance moves. While no balance is shown having an indicator moving in a circle, such are well-known. In the notebook shown in FIG. 4, the graduations of the different scales on the different pages are arranged around the edge of the hole 14. The seat for receiving the notebook of FIG. 4 is arranged on the balance in such a way that the indicator will extend through the notebook and travel a circular path close to the edge of the hole 14.

In FIGS. 5 and 6, notebooks are shown for use with balances in which the indicator moves along an arc of a circle. FIG. 5 is for positioning on the concave side of such an arc and FIG. 6 is a notebook for positioning on the convex side of the arc of movement of the indicator.

The pages of the notebook need not be limited to culinary or dietetic uses but may include pages calculating different postal rates with a different page for different types of postage, such as regular, air mail, etc. Pages may also be provided for different weight systems, such as the metric, Anglo-Saxon, and the like.

I claim:

1. In a balance having a material-receiving pan and an indicator movable along a predetermined path in response to the weight of material placed on said pan, the improvement comprising:

a seat which includes a base portion and a wall portion for supporting a notebook and having an open side through which the notebook may be slidably inserted and removed, a notebook having a plurality of pages, said notebook being insertable into and removable from said seat, said notebook having an edge thereof extending along and adjacent to said predetermined path when the notebook is inserted in said seat, each of said plurality of pages having different indicia thereon along the edge thereof adjacent said path, said pages comprising a set of pages, binding means for binding said set of pages together to form a notebook, said binding means being larger than the seat so that only the notebook edge having said indicia can be inserted into the seat to abut the end wall of the seat thereby properly aligning the notebook together with the base portion and wall portion of the seat, and said binding means being such that any selected page may be positioned outermost of the set with its indicia along said path whereby the notebook may be inserted, aligned and removed without attaching or securing the notebook to the seat.

2. The balance according to claim 1, in which said seat includes a transparent front wall behind which said notebook may be inserted.

3. The balance according to claim 1, in which said balance includes a set of indicia thereon separate from said notebook and arranged along said predetermined path in such a way that such indicia are visible when the notebook is inserted in said seat.

4. The balance according to claim 1, in which said predetermined path is a straight line and the indicia on the pages of said notebook are arranged along a rectilinear edge of the notebook.

5. The balance according to claim 1, in which said predetermined path is an arc of a circle and in which the edges of the notebook pages having indicia thereon is curved along substantially the same arc.

6. The balance according to claim 1, in which said predetermined path is a circle and the edge of the pages of said notebook that has said indicia thereon is the edge of a circular opening through the notebook and the pages thereof, and said notebook when inserted in said seat being so positioned as to reveal said predetermined path through said circular opening of the notebook.

* * * * *